(12) United States Patent
Greenwood

(10) Patent No.: US 10,906,052 B2
(45) Date of Patent: Feb. 2, 2021

(54) DRAIN CHECK IN PRESSURE REGULATOR

(71) Applicant: Nelson Irrigation Corporation, Walla Walla, WA (US)

(72) Inventor: Riley D. Greenwood, Walla Walla, WA (US)

(73) Assignee: Nelson Irrigation Corporation, Walla Walla, WA (US)

( * ) Notice: Subject to any disclaimer, the term of this patent is extended or adjusted under 35 U.S.C. 154(b) by 212 days.

(21) Appl. No.: 15/984,066

(22) Filed: May 18, 2018

(65) Prior Publication Data

US 2019/0351435 A1 Nov. 21, 2019

Related U.S. Application Data

(60) Provisional application No. 62/511,634, filed on May 26, 2017.

(51) Int. Cl.
| | |
|---|---|
| B05B 1/30 | (2006.01) |
| B05B 12/08 | (2006.01) |
| G05D 16/02 | (2006.01) |
| A01G 25/16 | (2006.01) |
| G05D 16/06 | (2006.01) |

(52) U.S. Cl.
CPC .......... *B05B 1/3006* (2013.01); *B05B 12/087* (2013.01); *G05D 16/02* (2013.01); *G05D 16/065* (2013.01); *A01G 25/16* (2013.01)

(58) Field of Classification Search
CPC ..... B05B 1/3006; B05B 12/087; A01G 25/16; G05D 16/02; G05D 16/065
See application file for complete search history.

(56) References Cited

U.S. PATENT DOCUMENTS

| | | | |
|---|---|---|---|
| 2,665,708 A * | 1/1954 | Ghormley | ............. F16K 31/406 |
| | | | 137/493 |
| 3,874,404 A * | 4/1975 | Waight | ................... F16K 17/20 |
| | | | 137/493 |
| 4,481,969 A | 11/1984 | Fallon et al. | |
| 5,009,368 A | 4/1991 | Streck et al. | |
| 5,246,164 A | 9/1993 | McCann et al. | |
| 5,875,815 A | 3/1999 | Ungerecht et al. | |
| 6,374,853 B1 | 4/2002 | Callies | |
| 6,755,362 B2 | 6/2004 | Krieger et al. | |

(Continued)

FOREIGN PATENT DOCUMENTS

WO 2016/189466 12/2016

OTHER PUBLICATIONS

International Search Report and Written Opinion cited in PCT/US18/33641 dated May 21, 2018, 19 pages.

(Continued)

*Primary Examiner* — Jessica Cahill
*Assistant Examiner* — Patrick C Williams
(74) *Attorney, Agent, or Firm* — Nixon & Vanderhye P.C.

(57) ABSTRACT

A pressure regulator includes a housing having an inlet cap with an inlet flow passage and an outlet cap with an outlet flow passage. A plunger is reciprocally mounted in the housing. A stationary regulator valve seat is disposed between the inlet flow passage and an inlet to the plunger. A drain check shuttle is disposed in the inlet cap and positioned downstream of the regulator valve seat to prevent water from draining out of the regulator when an inlet water pressure is below a predetermined threshold.

24 Claims, 11 Drawing Sheets

(56) References Cited

U.S. PATENT DOCUMENTS

| | | |
|---|---|---|
| 6,758,238 B2 | 7/2004 | Callies |
| 6,938,842 B2 | 9/2005 | Choat et al. |
| 7,401,622 B2 | 7/2008 | Ungerecht |
| 7,805,221 B2 | 9/2010 | Nickerson |
| 8,567,433 B2 | 10/2013 | Ungerecht et al. |
| 9,128,489 B2 | 9/2015 | Bauman et al. |
| 2009/0165863 A1 | 7/2009 | Einav et al. |
| 2010/0032493 A1 | 2/2010 | Abts et al. |
| 2011/0024523 A1 | 2/2011 | Sesser et al. |
| 2015/0293539 A1 | 10/2015 | Greenwood et al. |

OTHER PUBLICATIONS

King et al., "A Variable Flow Rate Sprinkler for Site-Specific Irrigation Management", Applied Engineering in Agriculture, vol. 20(6): 765-770 (2004).

\* cited by examiner

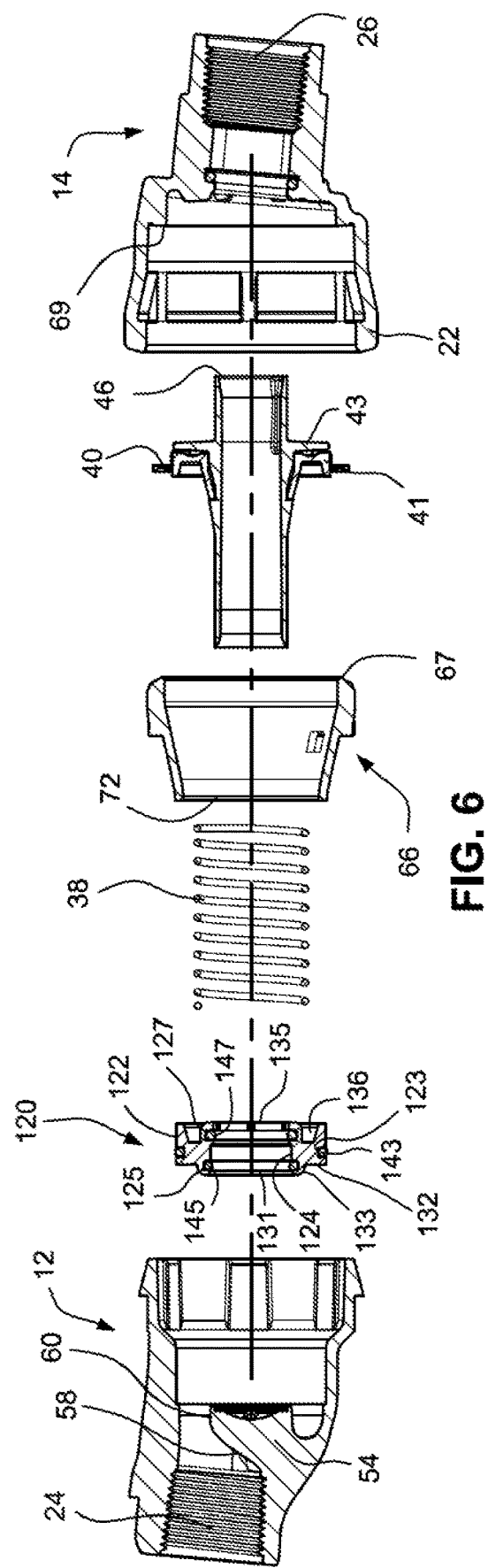

DRAIN CHECK IN PRESSURE REGULATOR

RELATED APPLICATION

This application claims priority to U.S. Provisional Patent Application 62/511,634 filed May 26, 2017, the entirety of which is incorporated by reference.

FIELD OF THE TECHNOLOGY

The invention relates to pressure regulators for liquid flow passages, and particularly to pressure regulators for supplying water to irrigation sprinklers and nozzles.

BACKGROUND

Irrigation systems often have several sprinklers and nozzles arranged along an extended water supply pipe. For example, a water supply pipe in a center pivot irrigation system may extend a quarter to half a mile (400 to 800 meters). The water supply pipe may have a diameter of six to ten inches (152 to 254 millimeters) and provide water for over a hundred sprinklers or nozzles arranged along the pipe. Similarly, solid set irrigation systems may include long rows of plastic water supply pipes placed between rows of crops with sprinklers on posts at regular locations along the supply pipes. Each sprinkler or nozzle is typically connected to the water supply pipe by a smaller water pipe that extends vertically and includes a pressure regulator.

The sprinklers and nozzles are typically designed to receive water under a relatively low pressure and within a narrow pressure range. There is a pressure regulator associated with each sprinkler or nozzle. Pressure regulators are typically placed in a water flow path and between a water supply pipe and a sprinkler or nozzle. The pressure regulator maintains a uniform water pressure flowing to the sprinkler or nozzle. The pressure regulator ensures that the water pressure is within the design range for the sprinkler or nozzle.

As a water supply pipe extends hundreds of meters, the pipe may rise over hills and drop into low points of an agricultural field. When flow to the water supply pipe is turned off, water collects at the low points in the pipe. The water at the low points drains out of the pipe and through the sprinklers or nozzles attached to the low points of the pipe, unless the sprinklers or nozzles have a drain check valve. The drainage of water may not be desired in some applications such as for crops that do not tolerate temporary flooding. The concern of excessive water on crops as water drains through sprinklers becomes greater for irrigation schedules that apply periodic bursts of water to the crops with water turned off between bursts.

Drain check valves in pressure regulators are used to prevent water flow through the regulator when the pressure drops, e.g., is turned off, in the water supply pipe. Prior art drain check valves are typically disposed at the outlet end of the regulator and typically include radially extending ribs, support beams or spokes to support the valve. These support structures extend into the flow path creating obstructions that hinder flow through the regulator.

BRIEF SUMMARY

The inventors conceived and disclose herein a drain check shuttle included in a drain check valve for a pressure regulator that does not require supporting struts extending through the flow passage in the regulator. Without struts, the drain check shuttle and its support structure are less prone to catching debris, such as grasses, in the water flowing through the pressure regulator.

A pressure regulator has been invented and is disclosed herein including: a housing including a flow passage extending from an inlet, through the housing to an outlet; a plunger configured to move reciprocally within the housing along an axis of the plunger, wherein the plunger is hollow and defines a passage included in the flow passage of the housing; a stationary regulator valve seat in the housing and disposed between the inlet flow passage and an inlet to the plunger; and an annular drain check shuttle within the housing and configured to move reciprocally with respect to both the housing and the plunger, wherein the drain check shuttle has a first position within the housing at which the drain check shuttle annularly abuts the regulator valve seat and closes the flow passage and a second position displaced from the regulator valve seat and which opens the flow passage.

A pressure regulator has been invented and is disclosed herein that includes a housing including an inlet flow passage and an outlet flow passage, the housing including an inlet cap having the inlet flow passage and an outlet cap having the outlet flow passage, the inlet cap and the outlet cap being connected to one another; a plunger reciprocally mounted in the housing; a stationary regulator valve seat disposed between the inlet flow passage and an inlet to the plunger; and a drain check shuttle disposed in the inlet cap and positioned immediately downstream of the regulator valve seat to prevent water from flowing through the outlet flow passage when an inlet water pressure is below a predetermined threshold.

A pressure regulator has been invented and is disclosed herein that includes a housing having an inlet cap and an outlet cap connected to one another; a fluid passageway for conveying fluid through the regulator; a plunger reciprocally mounted in the housing; a stationary regulator valve seat disposed between the inlet flow passage and an inlet to the plunger; and a drain check shuttle having an annular shape including an outer wall positioned adjacent an inner side wall of the housing and an inner wall delimiting a bore formed through the check valve shuttle, the plunger being slidably received in the bore, wherein the fluid passageway includes an inlet flow passage in the inlet cap, a flow path through the plunger and an outlet flow passage in the outlet cap.

Other aspects, features, and advantages of the disclosed and novel drain check valve for a pressure regulator are apparent from the following detailed description when taken in conjunction with the accompanying drawings, which are a part of this disclosure and which illustrate, by way of example, principles of this technology.

BRIEF DESCRIPTION OF THE DRAWINGS

FIG. 6 is an exploded view of the pressure regulator of FIG. 1 showing components in cross-section;

DETAILED DESCRIPTION

Figure 1:
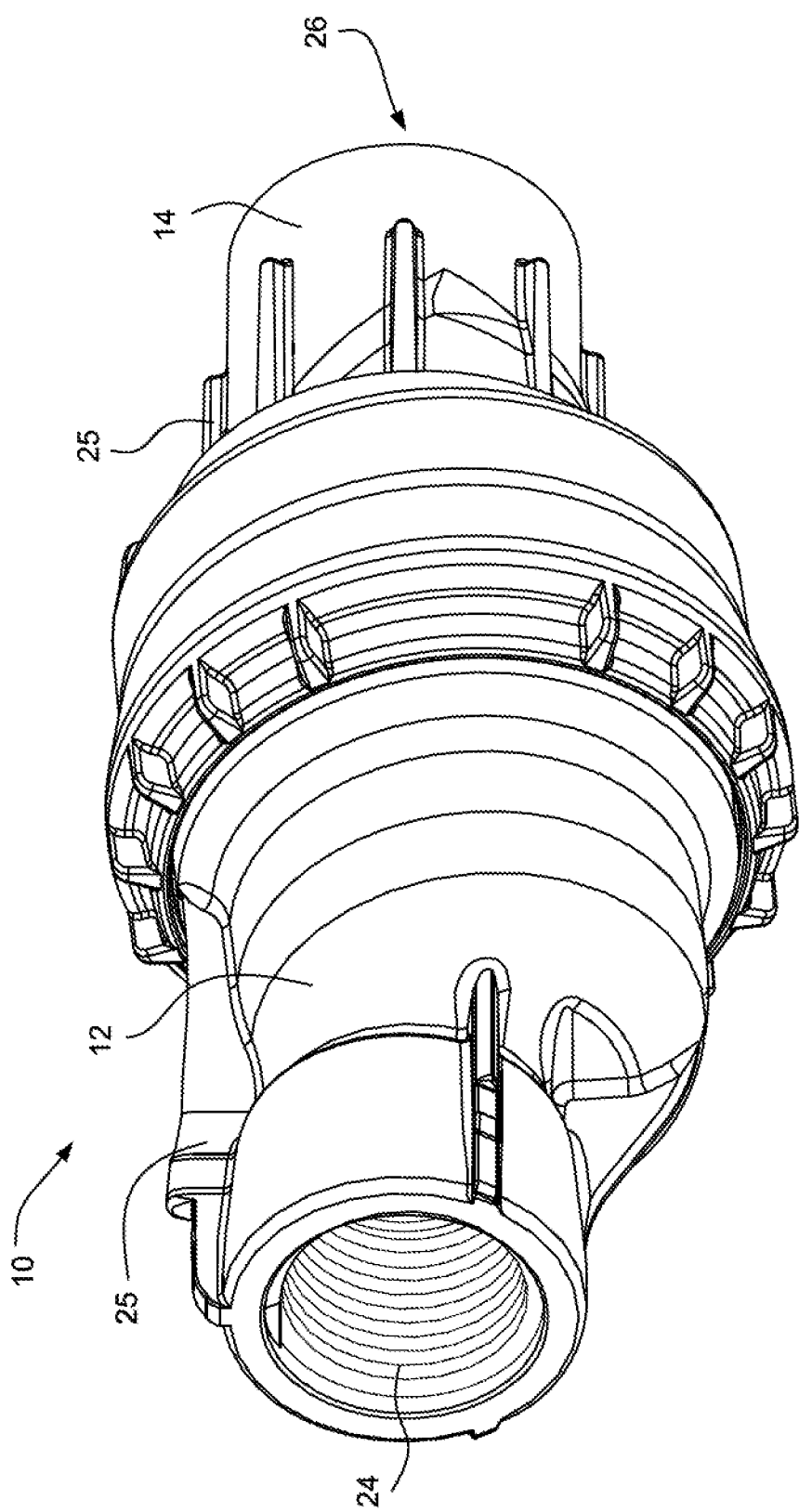
FIG. 1 is an inlet side perspective view of a pressure regulator with a novel drain check valve.
Figure 2:
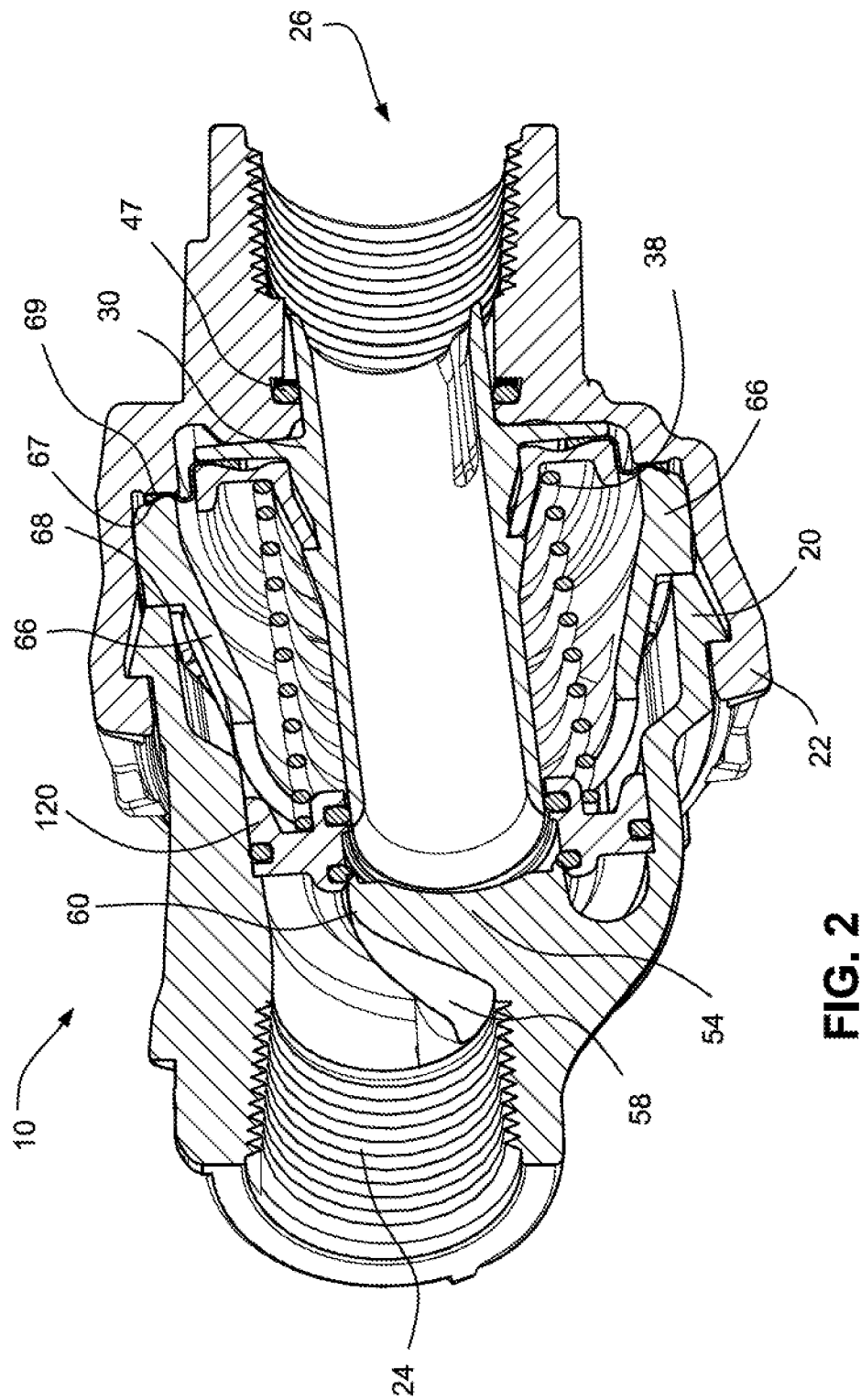
FIG. 2 is an inlet side perspective view of the pressure regulator of FIG. 1 shown in cross-section.

FIGS. 1 and 2 show a flow-through type pressure regulator 10 in perspective and cross-sectional views respectively. The pressure regulator 10 includes a housing formed by an inlet cap 12 and an outlet cap 14. The inlet and outlet caps are connected by a snap connection. The inlet cap 12 includes a connector 20 at an end portion therefore and the outlet cap 14 includes a connector 22 at an end portion thereof, as shown in FIG. 2. Each connector 20, 22 has an inclined surface. The inclined surfaces engage and slide relative to one another when the inlet cap and the outlet cap are pushed towards one another. Once the inclined surfaces slide past one another, each connector is received in a catch to securely connect the inlet cap 12 and the outlet cap 14.

The connector 20 of the inlet cap 12 presses against a ledge 68 of a cylindrical liner 66 such that the liner is sandwiched between the connector 20 and the outlet cap 14. A downstream rim 67 of the liner 66 retains, e.g., clamps, an outer flange of diaphragm 40 against an annular rim 69 of the outlet cap 14. A secure connection between the diaphragm, inlet cap and outlet cap is needed to support the sprinkler assembly, avoid leakage of water from the pressure regulator and avoid separation of the pressure regulator.

Referring to FIGS. 1 and 2, the inlet cap 12 includes an inlet flow passage 24, and the outlet cap 14 includes an outlet flow passage 26. Ribs 25 on the inlet and outlet caps provide structural support for the inlet and outlet flow passages. The inlet and outlet flow passages may have threaded surfaces to receive water pipes (not shown) connected to the pressure regulator. The water pipe connected to the inlet flow passage provides water under pressure to the pressure regulator from a water supply pipe. A vertical water pipe (not shown) typically connects the pressure regulator to the water supply pipe. The outlet flow passage 26 may be connected to a sprinkler assembly that hangs or is otherwise supported by the pressure regulator.

Figure 3:
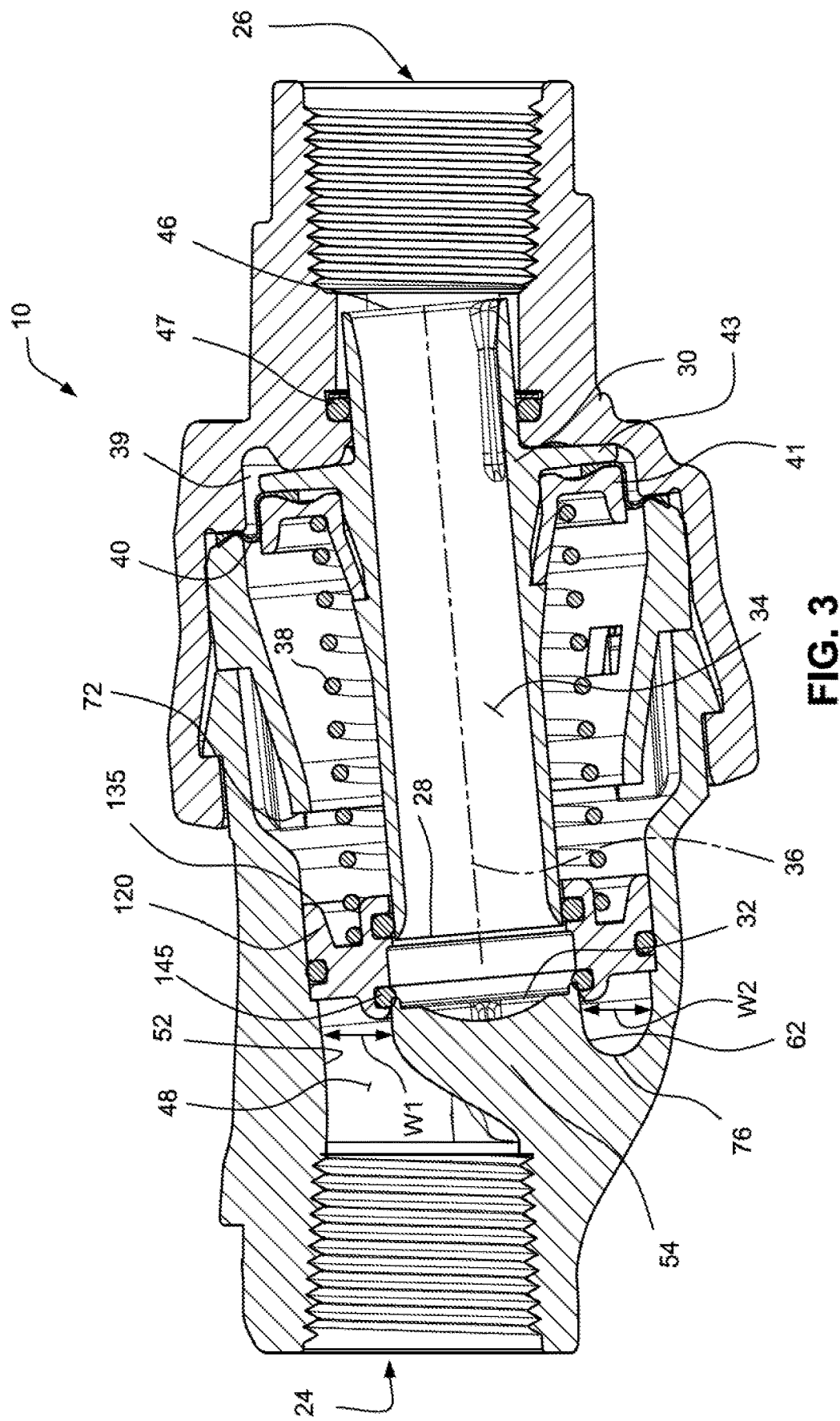
FIG. 3 is a cross-sectional view of the pressure regulator of FIG. 1 showing the drain check shuttle valve in an initially closed position.
Figure 4:
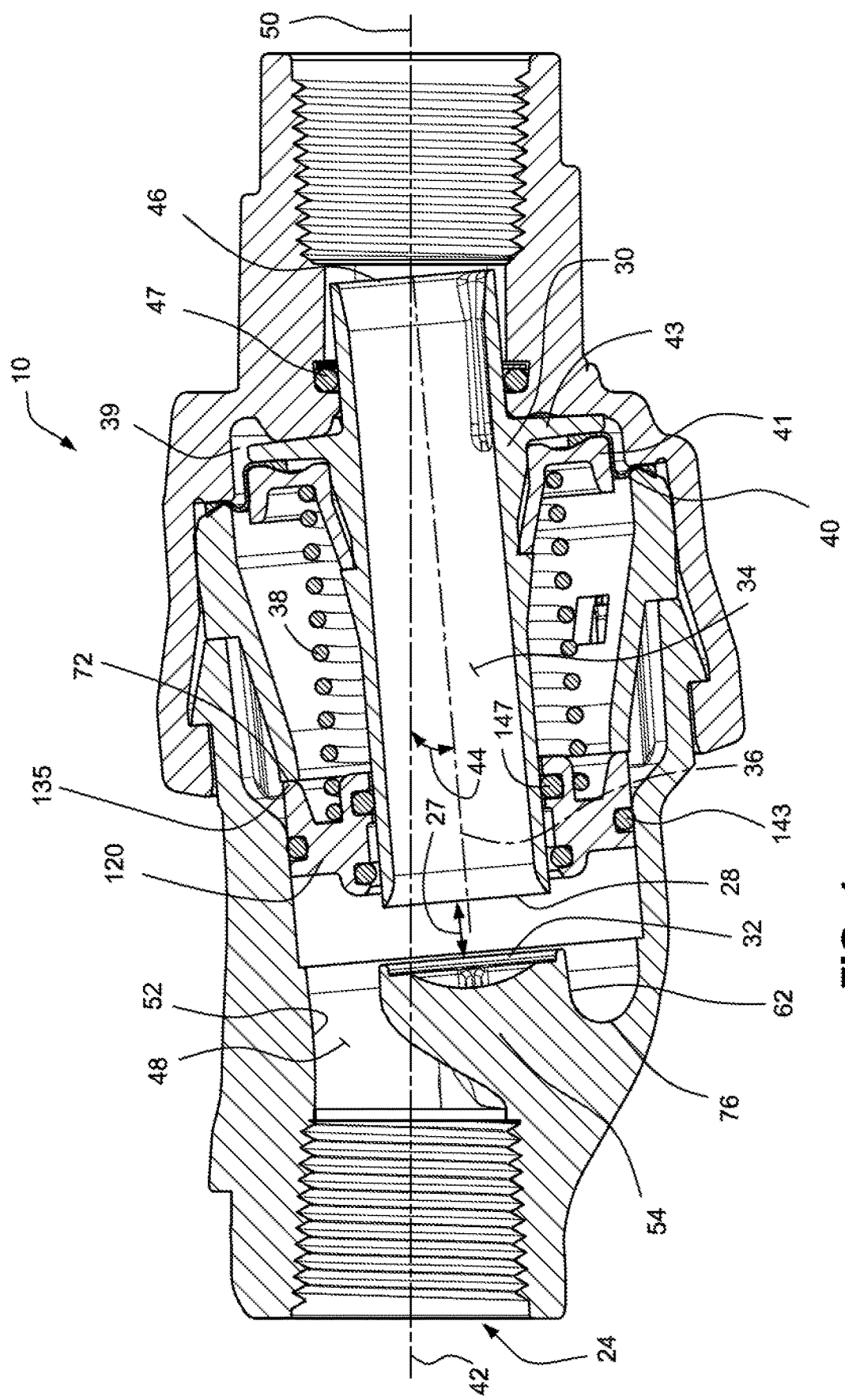
FIG. 4 is a cross-sectional view of the pressure regulator of FIG. 1 showing the drain check shuttle in an open position, prior to pressure regulation of the outlet flow.
Figure 5:
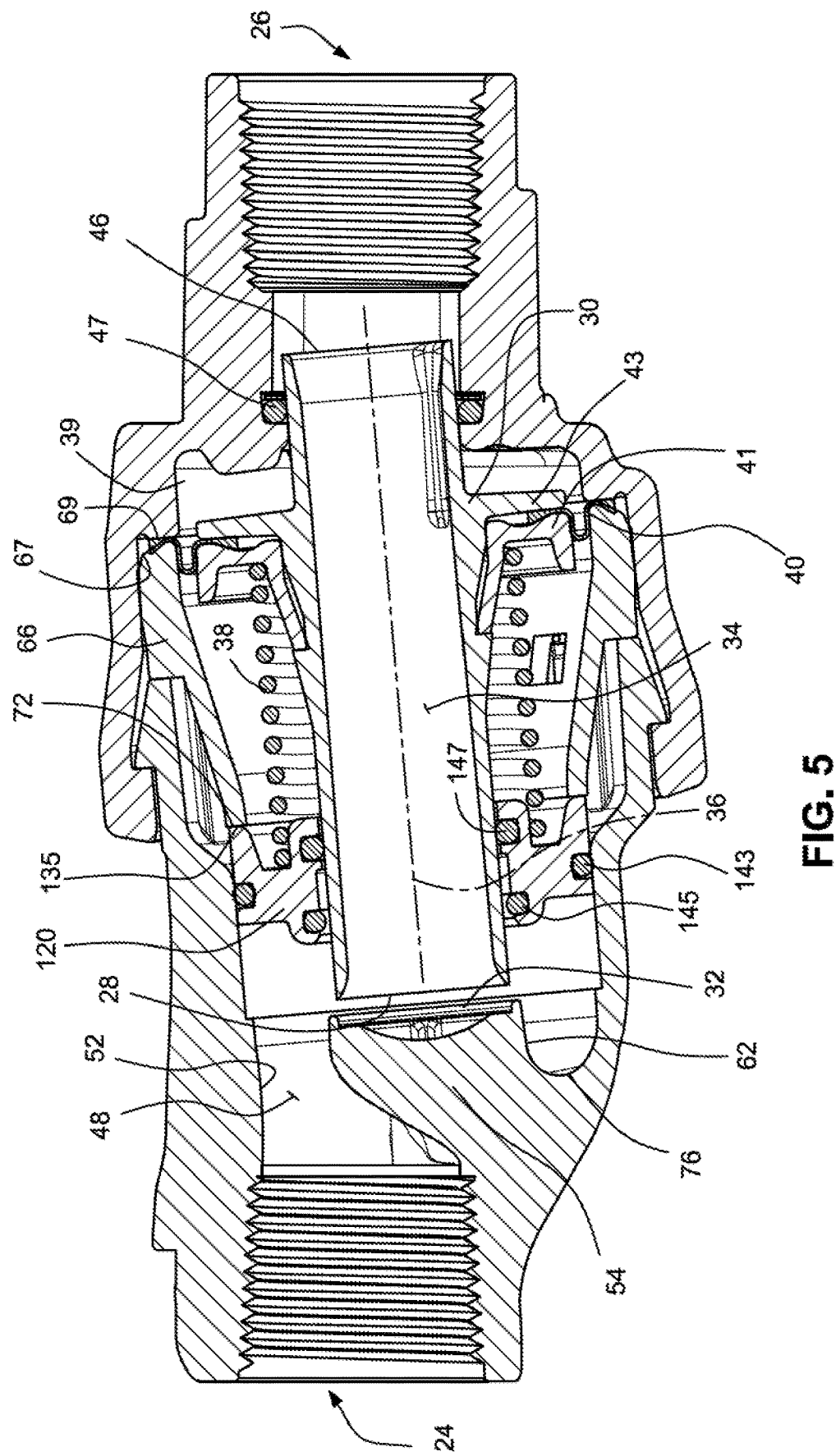
FIG. 5 is a cross-sectional view of the pressure regulator of FIG. 1 showing the drain check shuttle valve in the open position and the plunger is in a position to regulate the outlet pressure.

FIGS. 3 to 5 show the pressure regulator 10 in cross section. FIG. 4 shows a wide gap 27 in the flow passage through the regulator. FIG. 5 shows a smaller gap that restricts the water passage. The pressure regulator 10 reduces the water pressure to maintain a constant water pressure in the outlet flow passage 26, regardless of the water pressure in the inlet flow passage 24. Additionally, the pressure regulator includes an annular drain check shuttle 120 that blocks water from passing through the pressure regulator when the water pressure in the inlet flow passage 24 is below a predetermined threshold. The drain check shuttle 120 prevents water remaining in the water supply pipe from draining through the regulator while the inlet water pressure is below the predetermined threshold (e.g., when the irrigation system is off). FIG. 3 shows the drain check shuttle 120 in a closed position whereas FIGS. 4 and 5 show the drain check shuttle in an open position, as will be later described in detail.

To maintain a uniform outlet water pressure, the pressure regulator 10 widens or narrows the gap 27 depending upon the water pressure at the outlet flow passage 26. The gap 27 is the most constricted portion of the flow passage in the pressure regulator. The width (see double arrow in FIG. 4) of the gap 27 adjusts automatically in response to the outlet water pressure. The gap 27 is widest while the water pressure in the outlet flow passage 26 is no greater than a prescribed pressure level (FIG. 4). The prescribed pressure level may be set during the design of the pressure regulator and is dictated by the rate of the spring 38 (also known as the spring constant). The gap 27 narrows (FIG. 5) if the water pressure in the outlet flow passage 26 exceeds the prescribed pressure. Narrowing the gap 27 results in a corresponding reduction in water pressure at the outlet 26 of the regulator.

The gap 27 is formed between an inlet 28 to a tubular plunger 30 and a stationary regulator valve seat 32. The size of the gap 27 is determined by the axial position of the plunger inlet 28 relative to the regulator valve seat 32. An annular section or circular disc of the regulator valve seat is sized to receive the circular inlet 28 to the plunger to close the gap. The plunger 30 includes a cylindrical plunger passage 34 for water flowing between the inlet flow passage 24 and the outlet flow passage 26. The plunger 30 moves along its axis 36 within a short range of distances. The range of distances that the plunger moves corresponds to the gap 27. The movement of the plunger advances or retracts its inlet 28 towards and away from the regulator valve seat 32.

A helical spring 38 biases, e.g., pushes, the plunger towards the outlet cap 14 and away from the regulator valve seat 32. Water pressure in the outlet flow passage 26 is substantially the same as the water pressure in a diaphragm chamber 39. The water pressure in the diaphragm chamber pushes the plunger towards the regulator valve seat by acting on an effective annular area between the plunger passage 34 and convolution of the diaphragm 40 which is attached to the plunger. While the pressure in the diaphragm chamber 39 is below the prescribed pressure level, the spring force applied to the plunger and diaphragm is greater than the force due to water pressure applied to the diaphragm. The side of the diaphragm opposite to the outlet flow passage may be at an ambient pressure, which is achieved by venting the liner 66 to the atmosphere through vent holes in the liner.

As the water pressure at the diaphragm chamber 39 increases beyond the prescribed pressure, the pressure applied to the diaphragm 40 overcomes the spring force and moves the plunger 30 towards the regulator valve seat 32 to narrow the gap 27. The narrowing of the gap 27 reduces the water pressure in the diaphragm chamber 39. The reduced water pressure lessens the pressure applied to the diaphragm 40 and allows the spring 38 to retract the plunger 30 to widen the gap 27. The offsetting spring force and water pressure determine the width of the gap 27 and regulate the water pressure at the diaphragm chamber 39.

Referring to FIGS. 3 to 6, the diaphragm 40 may be an annular, flexible skirt secured to the plunger between a diaphragm retainer 41 and a plunger flange 43. The diaphragm retainer 41 may slide over the tube of the plunger and snap into a groove around the circumference of the tube. The plunger flange 43 may be integral with the tube of the plunger. Before the diaphragm retainer 41 is snapped in place on the tube of the plunger, the diaphragm 40 is placed between the plunger flange and diaphragm retainer. The diaphragm is secured between the diaphragm retainer 41 and plunger flange 43, by snapping the diaphragm retainer on the tube of the plunger. The diaphragm is secured to the housing of the pressure regulator by being clamped between the downstream rim 67 of the liner 66 and an annular rim 69 of the outlet flow cap 14.

A sealing element, e.g., a damper O-ring 47 is seated in the outlet cap 14 and acts to dampen unwanted plunger oscillations which may otherwise occur under certain conditions (e.g., higher flow rates and/or high pressure differentials).

As shown in FIG. 4, the plunger 30 has an axis 36 offset from the axis 42 of the inlet flow passage 24. The offset may be an angular offset 44 in a range of about three to twelve and one-half degrees. Test indicates that angular offsets in a range of three to eight degrees, such five degrees, provide optimal regulator performance by minimizing turbulence and nonuniform flow at the outlet of the regulator, suppressing clogging of the gap by debris and minimizing pressure losses through the regulator.

The plunger axis 36 may intersect the axis 42 of the inlet cap near the downstream end 46 of the plunger 30. Offsetting the plunger axis 36 is contrary to most conventional approaches that align the axis of the plunger with the axes of the inlet and outlet flow passages. Intersecting the plunger axis 36, the end of the plunger aligns the outlet of the plunger with the outlet flow passage, where the outlet axis 50 is coaxial with the inlet flow axis 42.

The axis 50 of the outlet flow passage 26 may be coaxial to the axis 42 of the inlet flow passage 24. Having these axes 42, 50 coaxial minimizes force moments applied to the pressure regulator by the inlet and outlet water pipes attached to the regulator. Having these axes 42, 50 coaxial also assists in achieving vertical alignment along the inlet pipe, pressure regulator, outlet water pipe and the sprinkler. A sprinkler typically works best, e.g., when projecting a symmetrical water spray pattern, if its rotational axis is vertical.

Figure 12:
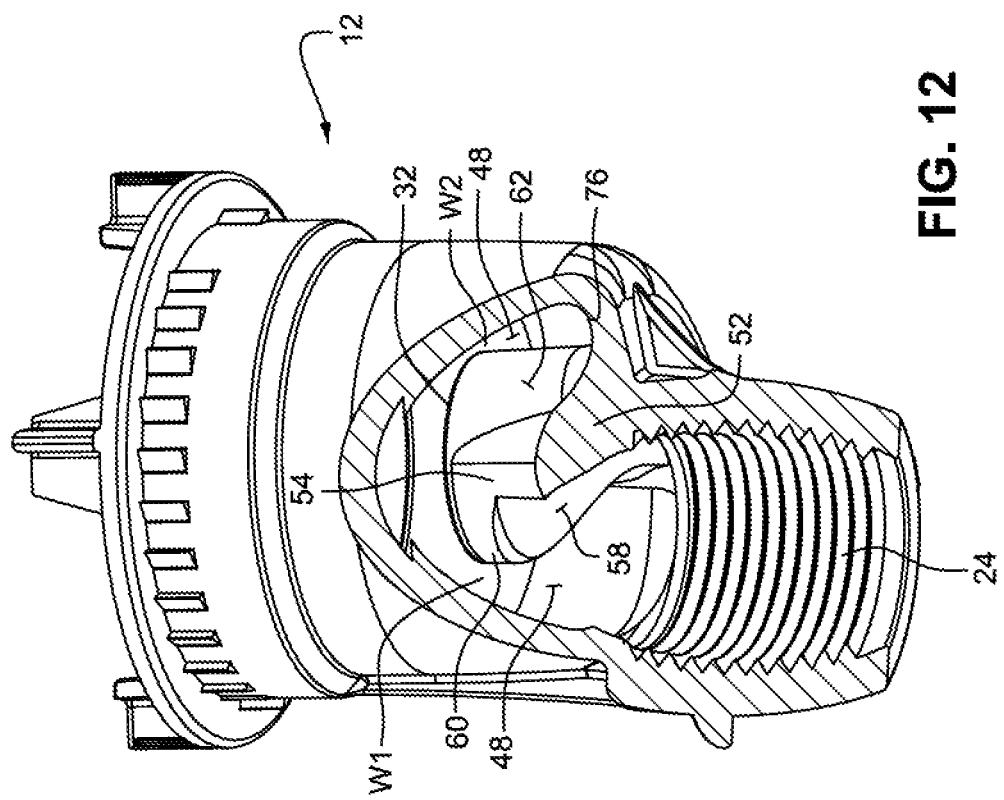
FIG. 12 is a perspective view of an inlet cap of the pressure regulator shown in FIG. 1 with a portion of the inlet cap cut away.

FIG. 12 illustrates the inlet cap 12 in a perspective view with a portion of the cap cut away. A chamber 48 of the flow passage is shown surrounding the regulator valve seat 32 and strut 54.

The strut 54 may be a single strut having an upstream surface 58, a nose 60, and a back surface 62 that is generally parallel to the plunger axis 36. The nose 60 and back surface 62 may form a generally cylindrical post section of the strut extending downstream into chamber 48. The upstream surface 58 of the strut slopes from the sidewall 52 of the inlet cap 12. The side edges of the upstream surface 58 extend to the back surface 62 of the strut. The strut may be embodied with various shapes including the generally triangular shape attached to the sidewall and downstream post shown in FIG. 2. For example, the post section of the strut may be more pronounced than shown in FIG. 2. The strut extends downstream into the chamber 48, which is in contrast to most conventional cantilevered-beam struts that extend solely radially into the flow stream.

Referring to FIGS. 2 and 3, the upstream surface 58 of the strut may be smooth with a slight convex cross-sectional shape in a direction parallel to the plunger axis 36. The upstream surface 58 of the strut facing the water flow is at a steep slope, such as at an angle in a range of twenty-five to fifty-five degrees. The steep slope of the upstream surface 58 deflects debris off the strut and into a gap (W1) of the flow chamber 48. Debris reaching the upstream surface 58 is swept by the water flow along the upstream surface and off the nose 60 of the strut.

The strut 54 may have a generally triangular shape and a downstream post as is shown in FIGS. 2-5. The apex of the triangle is integrated with the inlet cap and is aligned with the sidewall of the inlet flow passage 24. The legs of the triangle are formed by the upstream surface 58 and the back surface 62 of the strut. The triangular shape provides a strong supporting brace for the regulator valve seat 32, which is at the base of the triangle. A triangular brace shape is suited to support the regulator valve seat and withstand a water flow, especially as compared to a conventional cantilevered strut.

Referring to FIGS. 3-5, the chamber 48 may be formed between the sidewall 52 of the chamber 48, the outer surfaces of the regulator valve seat 32 and strut 54, and an upstream surface of the drain check shuttle 120. Water enters the chamber 48 from the inlet flow passage 24 and, when the drain check shuttle is open (FIGS. 4 and 5), leaves the chamber by flowing into the plunger inlet 28. The chamber 48 surrounds the regulator valve seat 32 and strut 54, and has a larger cross section than the cross section of the inlet flow passage 24. The large cross section of the chamber 48 provides a relatively large volume of water to flow over and around the strut 54 and against the drain check shuttle (FIG. 3) or into the plunger inlet 28 (FIGS. 4 and 5). The distance (W1) between the nose 60 (also the front) of the strut and the sidewall 52 may be substantially the same as the distance (W2) between the back of the strut and the sidewall 52. The large chamber 48 and the substantially equal distances (W1, W2) between the strut 54 and the sidewall 52 provide an open flow passage that is substantially free of areas in the chamber where debris may be restricted. Further, the chamber 48 is free of radially projecting spokes, beams, ribs, vanes and other radially extending supports conventionally used for a regulator valve seat.

Offsetting the plunger axis 36 allows the strut 54 and regulator valve seat 32 to be shifted down into the expanded chamber 48. Due to the shift, the regulator valve seat and strut may be positioned closer to and integrated with the threaded sidewall 52 of the inlet flow passage 24, as compared to a conventional cantilevered strut extending radially to the center of the flow passage.

The flow path through the inlet flow passage 24, through the chamber 48 and into the plunger 30 is relatively uninterrupted and smooth. The flow path may be free of radially extending support beams, ribs and spokes that, if present, could disrupt the flow. The sloping upstream surface 58 of the strut 54 extends from the sidewall of the inlet flow passage 24 to the chamber 48 and further to the nose 60 of the strut.

The upstream surface 58 of the strut starts in or at the end of the inlet flow passage 24 and is upstream of the chamber 48. The upstream surface 58 starts radially inward of the sidewall of the chamber 48 due to the angular offset 44 and as shown in FIG. 4. The upstream surface 58 directs water into the chamber and around the strut. A portion of the water flowing from the inlet flow passage 24 directly enters the chamber 48, and does not directly contact the strut. Another portion of the water flows over and around the upstream surface 58 to enter the chamber and around the back surface 62.

Water from the inlet flow passage 24 enters the chamber 48. Much of the water flows through the front region (W1) of the chamber 48 and into the plunger while avoiding the strut. Avoiding the strut reduces the amount of turbulence created as the water flows through the chamber 48. Water that flows over the upstream surface 58 of the strut may be deflected into the plunger or may flow to the chamber back region (W2) behind the strut. The water in the back region gap (W2) flows to gap 27 and into the plunger. The shape of the chamber 48 and the relatively large regions (W1, W2) contribute to minimizing turbulence and flow velocity variations in the water flowing through the chamber 48 and into the plunger.

Figure 14:
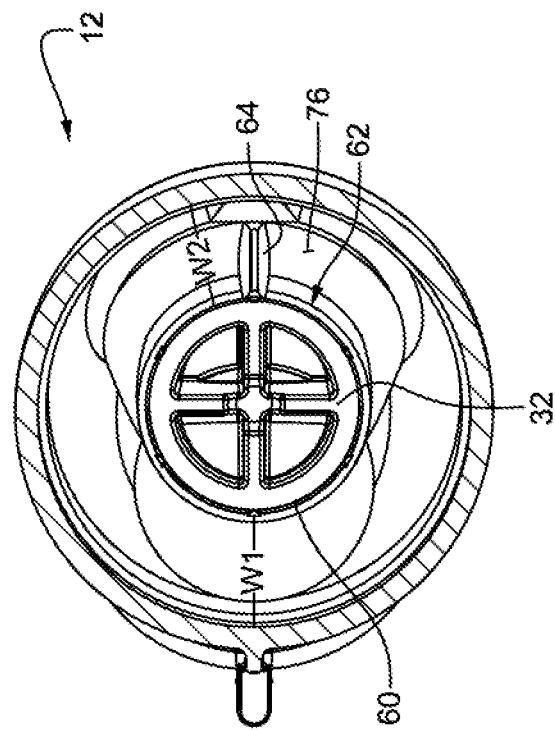
FIG. 14 is an end view showing the outlet end of the inlet cap shown in FIG. 12 having an internal vane to direct water flow.

At least one vane or rib 64 (FIG. 14) in the region (W2) may be used to direct the flow towards the plunger and reduce turbulence in the flow. The vane 64 is optional and is not shown in the embodiments in FIGS. 1 to 13. The vane 64 may be integral with the inlet cap and fixed to an overhang 76 between the back surface 62 of the strut and the sidewall 52 of the chamber. The vane deflects water flowing around the strut towards the plunger. The vane may be a planar rib, have an inverted V-shape or another shape that deflects water towards the plunger.

The relatively large flow volume in the chamber 48 tends to reduce frictional losses in the water pressure. The frictional pressure loss may be less than five (5) pounds per square inch (34 kPa) while the pressure regulator is operating at a maximum water flow. The reduction in the frictional pressure loss is due, in part, to the relatively high hydraulic diameter of the chamber 48. The hydraulic diameter is the ratio of the cross-sectional area of the chamber 48 and the total length of the wetted perimeter of the chamber 48 and the strut at said cross section.

Turbulence and velocity variations in the flow entering the plunger settle out as the water flows through the plunger passage. A plunger passage 34 having a flow length equal to at least five diameters of the passage is generally sufficient to settle turbulence and velocity variations. The length of the plunger may also be selected such that axis 36 of the plunger intersects the axis 50 of the outlet flow passage 26 in the outlet cap.

Figure 13:
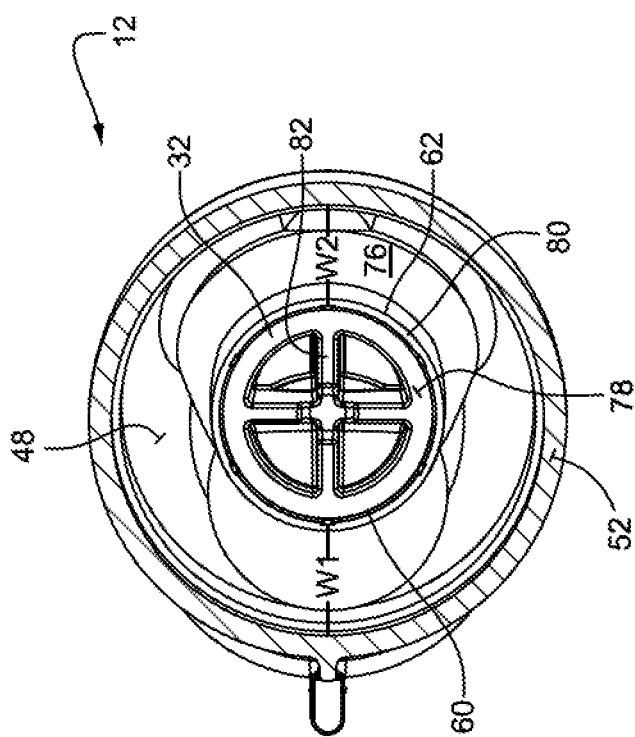
FIG. 13 is an end view showing the outlet end of the inlet cap shown in FIG. 12.

As shown in FIG. 13, the regulator valve seat 32 may be an annular surface 78 in a plane parallel to the inlet 28 of the plunger. A raised ridge 80 at the circumference of the annular surface 78 guides the plunger inlet 28 to the annular surface. The regulator valve seat and strut may be generally hollow with supporting ribs 82 forming an X-brace within the hollow area of the strut.

As mentioned earlier, the pressure regulator includes a drain check shuttle 120 to prevent drain out through the regulator (and corresponding sprinkler) when the water pressure in the inlet flow passage 24 is below a predetermined threshold (e.g., minimum operating pressure). By this arrangement, water is held in the piping of the irrigation system when the system is off.

The drain check shuttle 120 may have a toroid or ring-shape including an outer circumferential wall 122 and an inner circumferential wall 124, as shown in FIGS. 6-10. A groove 123 is formed in the outer wall 122 and receives a sealing element (e.g., an O-ring 143) therein. Alternatively, the sealing element may be a rolling diaphragm similar in structure to diaphragm 40. The inner wall 124 defines a bore through the drain check shuttle and includes an upstream groove 125 and a downstream groove 127 formed therein. Sealing elements (e.g., O-rings 145, 147) are respectively received in the grooves 125, 127.

An upstream end 131 of the drain check shuttle 120 includes ridge 133 encircling the bore and a pressing surface 132 positioned around the ridge. A downstream end 135 of the drain check shuttle includes an annular recess 136.

Figure 8:
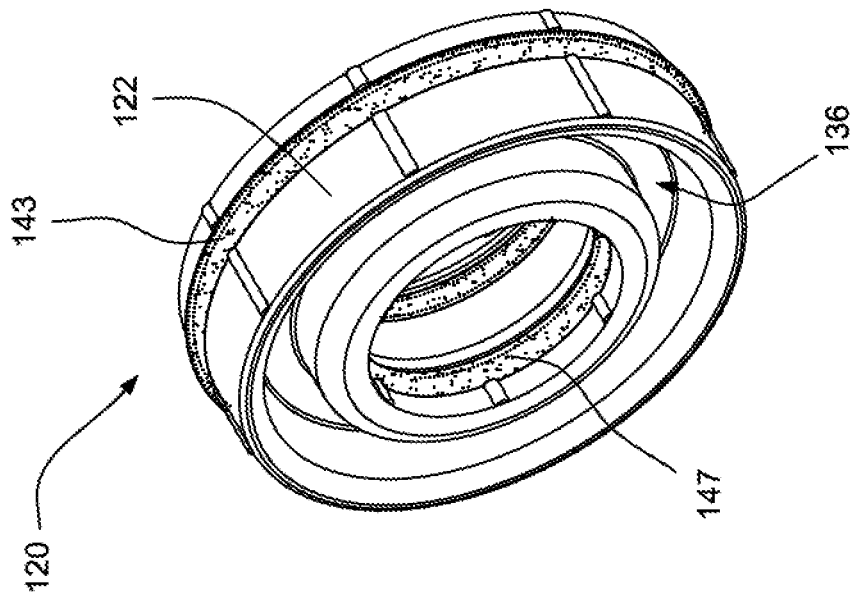
FIG. 8 is a downstream perspective view of the drain check shuttle of FIG. 7.
Figure 7:
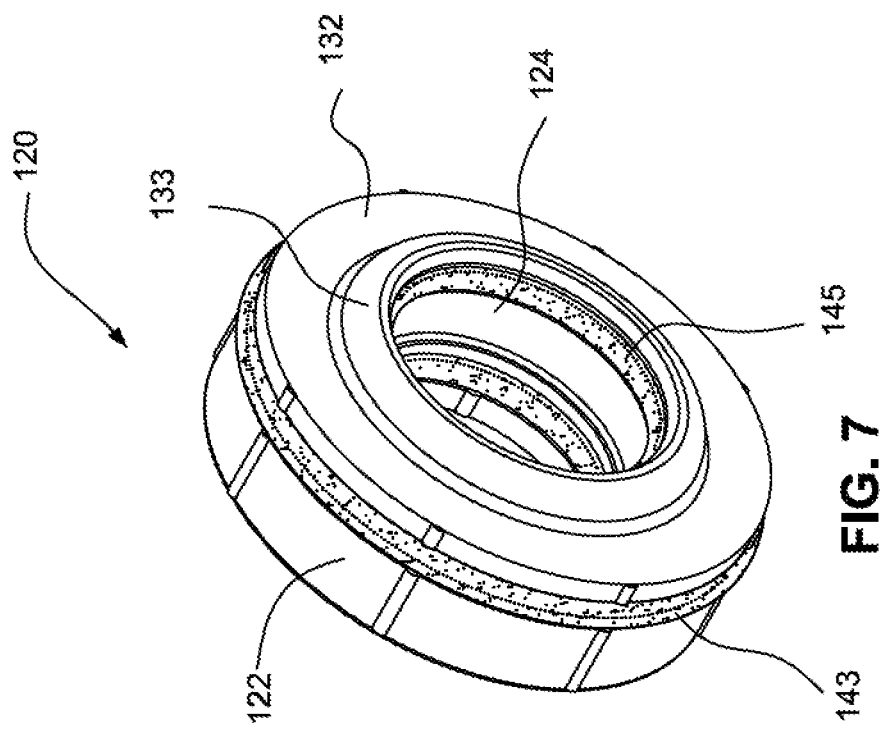
FIG. 7 is an upstream perspective view of the annular drain check shuttle of the pressure regulator shown in FIG. 1.
Figure 10:
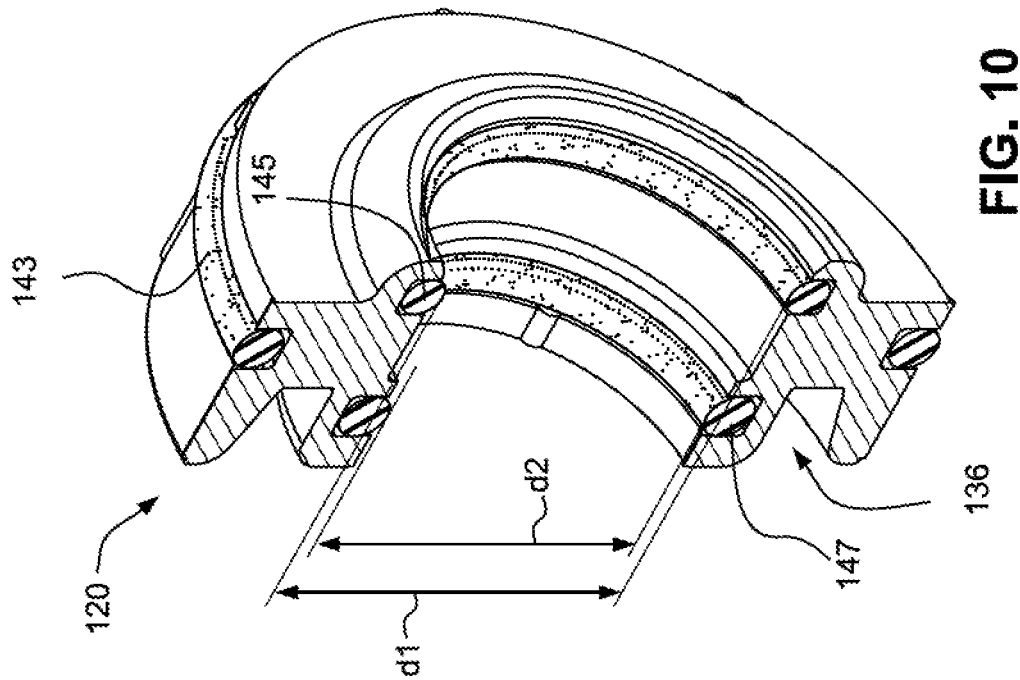
FIG. 10 is a cross-sectional view of the drain check shuttle along line 10-10 in FIG. 9.
Figure 9:
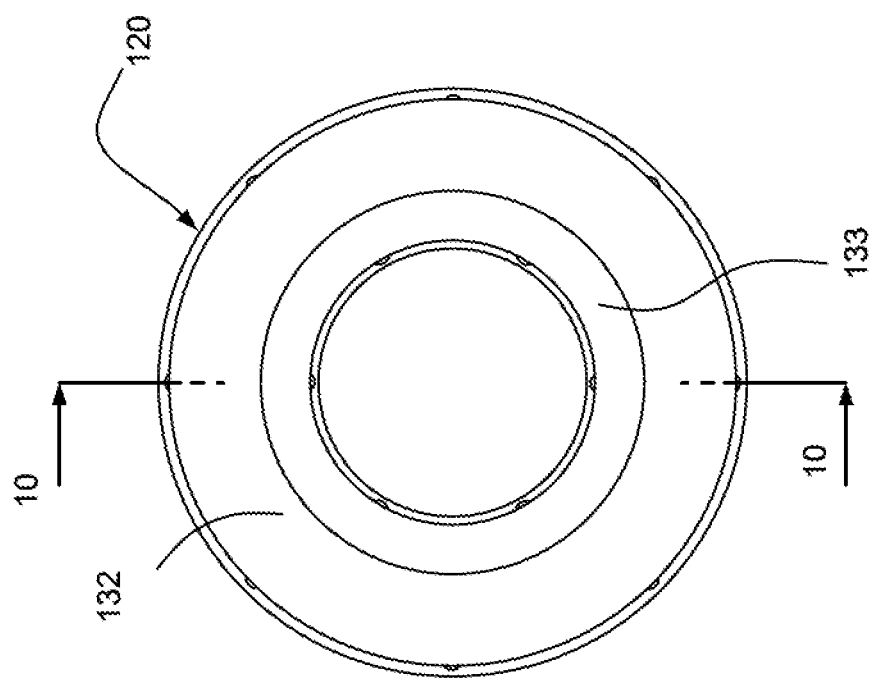
FIG. 9 is a front view of the drain check shuttle of FIG. 7.

Turning back to FIG. 3, the drain check shuttle 120 is shown in the closed position. In this position, the O-ring 145 seals against the regulator valve seat 32 to prevent water from flowing past the shuttle valve. The drain check shuttle 120 is urged into the closed positioned by a force exerted on the shuttle by spring 38 which is seated in the recess 136 (as shown in FIGS. 8 and 10) on the downstream side of the shuttle. In the closed position, the drain check shuttle 120 prevents water from draining out of the regulator when the irrigation system is off.

The drain check shuttle 120 remains in the closed position until a predetermined water pressure threshold in the inlet flow passage 24 is exceeded. Water in the chamber 48 will exert a force against the pressing surface 132 of the drain check shuttle 120. When the force of the water on the pressing surface 132 exceeds the predetermined inlet water pressure value thereby overcoming the force of the spring 38, the drain check shuttle will slide downstream relative to the housing, as shown in FIG. 4. The O-ring 143 forms a dynamic seal with the inner side wall 52 of the inlet cap 14.

The liner 66 has a ledge 72 (or step) formed thereon which contacts the downstream end 135 of the drain check shuttle 120 to limit axial travel (along axis 36) of the shuttle when the drain check is fully open.

As can be seen in FIG. 4, a gap is formed between the regulator valve seat 32 and the O-ring 145 and thus water may freely flow from chamber 48 into the inlet 28 of the plunger 30. The drain check shuttle 120 now provides no obstructions to the flow path of the water. That is, the drain check shuttle 120 is free of radially extending support beams, ribs, etc. that would extend into the flow path and disrupt the flow.

As the inlet water pressure increases, the plunger is moved in an upstream direction to narrow the gap 27 to regulate the outlet water pressure, as shown in FIG. 5 and described above. The O-ring 147 forms a dynamic seal with the plunger 30 to prevent water from flowing downstream of the drain check shuttle 120 in an area between the valve and the plunger. As shown in FIG. 10, it will be noticed that the O-ring 145 has a larger diameter (d1) than a diameter (d2) of the O-ring 147 thereby allowing the plunger 30 to slide relative to the drain check shuttle without contacting the O-ring 145.

Figure 11:
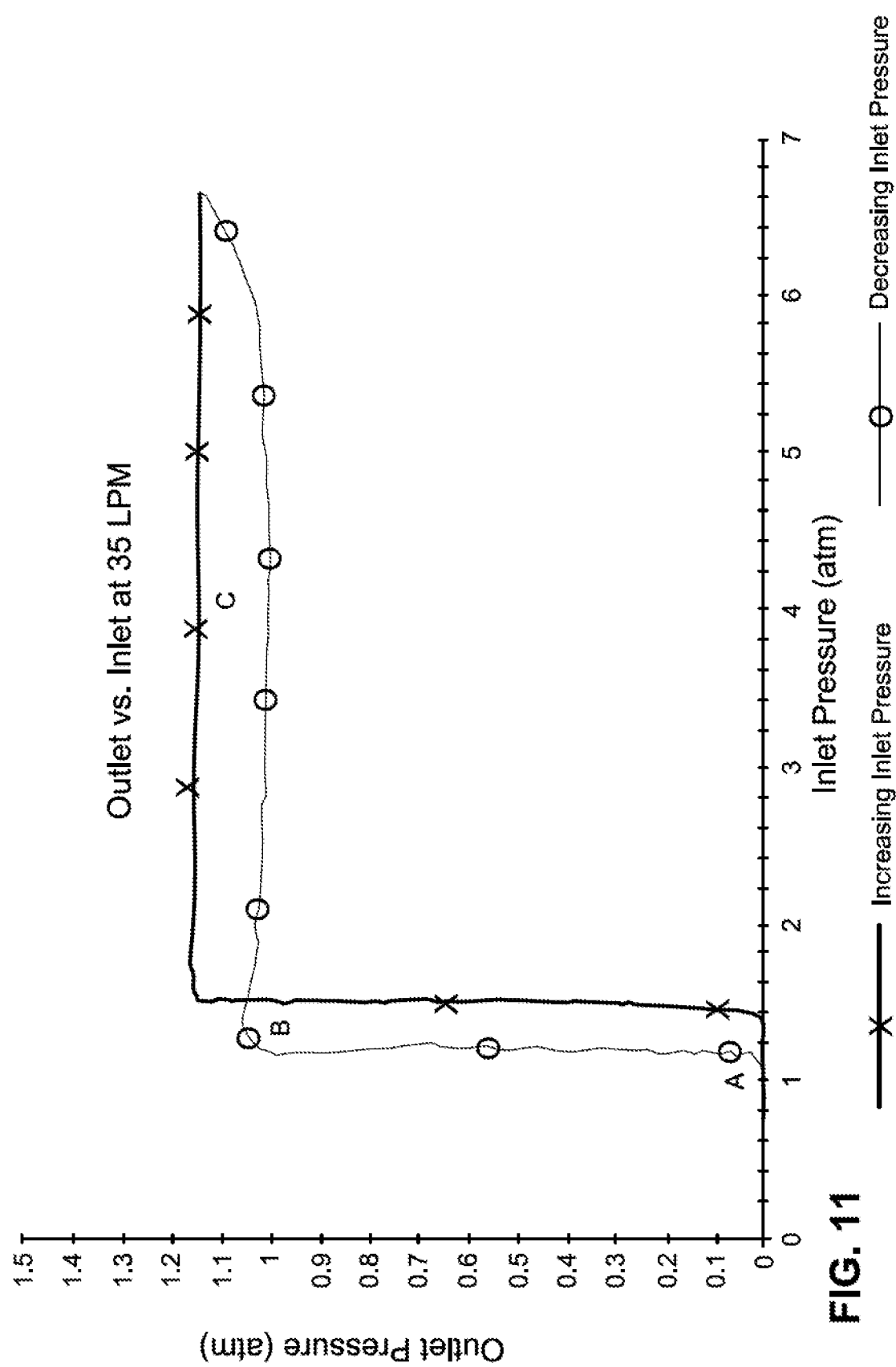
FIG. 11 is a graph showing outlet pressure versus inlet pressure of the pressure regulator with the novel drain check valve disclosed herein.

Turning to FIG. 11, a graph representing the outlet water pressure versus the inlet water pressure of a pressure regulator such as shown in FIG. 1. The heavier line in FIG. 11 moves in the direction of increasing water pressure at the inlet. The lighter line moves in the opposite direction which is decreasing water pressure.

At point A, the inlet water pressure is below a predetermined threshold and thus the drain check shuttle 120 is in the closed position (FIG. 3) to prevent water flow through the pressure regulator and cause the outlet water pressure to be zero. From points A to B along the heavier line, the drain check shuttle 120 starts to open by moving downstream towards the open inlet end of the plunger. As the inlet water pressure increases beyond the predetermined threshold (just beyond point B), the water pressure applies a force against the drain check shuttle (in a direction of fluid flow) that is greater than the spring bias force (applied in an opposite direction of fluid flow). As the inlet water pressure further increases, the plunger 30 begins to move towards the regulator valve seat 32, thus regulating the outlet flow's pressure (FIG. 5). As the inlet water pressure decreases (lighter weight line) from C to point B, the drain check shuttle remains in an open position. As the water pressure further decreases from points B to A, the drain check shuttle moves upstream towards the regulator valve seat and annularly occludes the inlet of the plunger. While the drain check shuttle is seated against the regulator valve seat, occluding the inlet to the plunger (at point A and lower pressures along lighter weight line), the shuttle stops water flow towards the outlet of the pressure regulator.

The drain check shuttle may move quickly (see closeness of points A and B) between the closed and open position. The quick movement means that the drain check shuttle is effectively an on-off valve for the drain regulator.

The regulation of the flow through the pressure regulator is performed by the plunger and the regulator valve seat. As the water pressure increases beyond the threshold needed to move the drain check shuttle, the increased pressure moves the diaphragm and shifts the plunger 30 towards the regulator valve seat. The movement towards the regulator valve seat reduces the flow passage between the regulator valve seat and plunger and thereby holds constant (point C) the water pressure at the outlet.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A pressure regulator comprising:
a housing including a flow passage extending from a housing inlet, through the housing to a housing outlet;
a plunger configured to move reciprocally within the housing along an axis of the plunger, wherein the plunger is hollow and defines a plunger passage included in the flow passage of the housing, the plunger passage including a plunger inlet at one end of the plunger and a plunger outlet at an opposite end of the plunger that faces the housing outlet,
a regulator valve seat in the housing and disposed between the housing inlet and the plunger inlet, wherein the regulator valve seat faces the plunger inlet; and
a drain check shuttle within the housing and configured to move reciprocally with respect to both the housing and the plunger, wherein the drain check shuttle has a first position within the housing at which the drain check shuttle abuts the regulator valve seat and closes the flow passage, and a second position displaced from the regulator valve seat and which opens the flow passage.

2. The pressure regulator of claim 1 wherein the drain check shuttle includes an annular structure having an outer perimeter configured to slidably engage the housing and an inner perimeter configured to receive and engage the regulator valve seat.

3. The pressure regulator of claim 2 wherein the inner perimeter of the drain check shuttle is configured to slidably engage the plunger.

4. A pressure regulator comprising:
a housing including a flow passage extending from an inlet, through the housing to an outlet;
a plunger configured to move reciprocally within the housing along an axis of the plunger, wherein the plunger is hollow and defines a passage included in the flow passage of the housing;
a regulator valve seat in the housing and disposed between the inlet to the flow passage and an inlet to the plunger; and
a drain check shuttle within the housing and configured to move reciprocally with respect to both the housing and the plunger, wherein the drain check shuttle has a first position within the housing at which the drain check shuttle abuts the regulator valve seat and closes the flow passage, and a second position displaced from the regulator valve seat and which opens the flow passage;
wherein the drain check shuttle includes an opening supporting a first annular seal configured to engage the regulator valve seat and supporting a second annular seal configured to engage the plunger;
and wherein a diameter of the first annular seal is greater than a diameter of the second annular seal.

5. A pressure regulator comprising:
a housing including an inlet flow passage and an outlet flow passage, the housing including an inlet cap having the inlet flow passage and an outlet cap having the outlet flow passage, the inlet cap and the outlet cap being connected to one another;
a plunger reciprocally mounted in the housing, wherein the plunger includes a plunger passage and a plunger inlet;
a regulator valve seat disposed between the inlet flow passage and the plunger inlet, wherein the regulator valve seat includes an annular surface aligned with the plunger inlet along an axis of the plunger passage, and the plunger has a first position at which the plunger inlet is spaced apart from the annular surface of the regulator valve seat and a second position in which the plunger inlet is adjacent the annular surface of the regulator valve seat; and
a drain check shuttle disposed in the inlet cap, the drain check shuttle being positioned downstream of the regulator valve seat and configured to prevent an incoming water flow from flowing through the outlet flow passage when an inlet water pressure is below a predetermined threshold.

6. The pressure regulator of claim 5, wherein the drain check shuttle is arranged to slide along an inner side wall of the inlet cap between a closed position in which the drain check shuttle seals against the regulator valve seat to prevent incoming water flow from entering the plunger passage and an open position in which the drain check shuttle is displaced from the regulator valve seat to permit the incoming water flow to pass through the plunger passage to the outlet flow passage.

7. The pressure regulator of claim 6, wherein the drain check shuttle includes a pressing surface facing upstream and arranged to interface with the incoming water flow when the drain check shuttle is in the closed position, and wherein once the inlet water pressure exceeds the predetermined threshold, the pressing surface is adapted to receive a force exerted thereon by the incoming water flow that causes the drain check shuttle to slide into the open position.

8. The pressure regulator of claim 7, wherein the drain check shuttle is arranged to slide into the open position against a force provided by a spring such that the force exerted on the pressing surface by the incoming water flow exceeds the force of the spring.

9. The pressure regulator of claim 8, wherein the spring is arranged to urge the drain check shuttle into the closed position.

10. The pressure regulator of claim 6, wherein the drain check shuttle has a ring-shape including an outer wall positioned adjacent the inner side wall of the inlet cap and an inner wall delimiting a bore formed through the drain check shuttle.

11. A pressure regulator comprising:
a housing including an inlet flow passage and an outlet flow passage, the housing including an inlet cap having the inlet flow passage and an outlet cap having the outlet flow passage, the inlet cap and the outlet cap being connected to one another;
a plunger reciprocally mounted in the housing;
a regulator valve seat disposed between the inlet flow passage and an inlet to the plunger; and
a drain check shuttle disposed in the inlet cap, the drain check shuttle being positioned downstream of the regulator valve seat and configured to prevent an incoming water flow from flowing through the outlet flow passage when an inlet water pressure is below a predetermined threshold;
wherein the drain check shuttle is arranged to slide along an inner side wall of the inlet cap between a closed position in which the drain check shuttle seals against the regulator valve seat to prevent incoming water flow from passing the drain check shuttle and an open position in which the drain check shuttle is displaced from the regulator valve seat to permit the incoming water flow to pass through the regulator to the outlet flow passage;
wherein the drain check shuttle has a ring-shape including an outer wall positioned adjacent the inner side wall of the inlet cap and an inner wall delimiting a bore formed through the drain check shuttle; and
wherein the drain check shuttle includes a first O-ring disposed in the inner wall of the drain check shuttle, the first O-ring arranged to seal against the regulator valve seat when the inlet water pressure is below the predetermined threshold.

12. The pressure regulator of claim 11, wherein a gap is formed between the regulator valve seat and the first O-ring when the drain check shuttle is in the open position to permit the incoming water flow to pass through the pressure regulator.

13. The pressure regulator of claim 12, wherein the drain check shuttle includes a second O-ring disposed in the inner wall of the drain check shuttle downstream of the first O-ring, the second O-ring arranged to form a dynamic seal with the plunger.

14. The pressure regulator of claim 13, wherein the drain check shuttle includes a third O-ring disposed in the outer wall of the drain check shuttle to form a dynamic seal with the inner side wall of the inlet cap, the third O-ring being configured to slide relative to the inner side wall of the inlet cap as the drain check shuttle slides between the closed position and the open position.

15. A pressure regulator comprising:
a housing including an inlet of the housing to an outlet of the housing, wherein a flow passage through the pressure regulator extends from the inlet to the outlet;
a plunger reciprocally mounted in the housing;
a plunger flow passage included in the flow passage and in fluid communication with the inlet and outlet;
a regulator valve seat disposed between the inlet of the housing and an inlet to the plunger flow passage;
a ring-shaped drain check shuttle including an outer wall adjacent an inner side wall of the housing and an inner wall delimiting a bore through the drain check shuttle, wherein the plunger is slidably received in the bore; and
an annular diaphragm coupling the plunger to the housing, wherein the diaphragm forms a deformable seal between the outlet of the housing and a chamber in the housing, a first side of the annular diaphragm is always in fluid communication with the outlet and a second side, opposite to the first side, is always in fluid communication with the chamber.

16. The pressure regulator of claim 15, wherein the drain check shuttle does not include ribs, spokes or support beams which extend into a fluid passageway extending from the inlet of the housing to the inlet of the plunger flow passage.

17. The pressure regulator of claim 16, wherein the drain check shuttle is disposed in an inlet cap of the housing.

18. The pressure regulator of claim 17, wherein the regulator valve seat is integral with the inlet cap of the housing.

19. The pressure regulator of claim 15, wherein the drain check shuttle prevents incoming fluid flow from passing through the outlet of the housing when an inlet pressure is below a predetermined threshold.

20. A pressure regulator comprising:
a housing including an inlet of the housing to an outlet of the housing;
a plunger reciprocally mounted in the housing;
a plunger flow passage in fluid communication with the inlet and outlet;
a regulator valve seat disposed between the inlet of the housing and an inlet to the plunger flow passage; and
a ring-shaped drain check shuttle including an outer wall adjacent an inner side wall of the housing and an inner wall delimiting a bore through the drain check shuttle, wherein the plunger is slidably received in the bore;
wherein the drain check shuttle prevents incoming fluid flow from passing through the outlet to the housing when an inlet pressure is below a predetermined threshold; and
wherein the drain check shuttle includes a first O-ring disposed in the inner wall of the drain check shuttle, and the first O-ring seals against the regulator valve seat while the inlet pressure is below the predetermined threshold.

21. The pressure regulator of claim 20, wherein the drain check shuttle is movably disposed in the housing such that when the inlet pressure is above the predetermined threshold, a gap is formed between the regulator valve seat and the first O-ring to permit the incoming fluid flow to pass through the pressure regulator.

22. The pressure regulator of claim 20, wherein the drain check shuttle includes a second O-ring disposed in the inner wall of the drain check shuttle downstream of the first O-ring, the second O-ring arranged to form a dynamic seal with the plunger.

23. The pressure regulator of claim 22, wherein the second O-ring has a diameter that is smaller than a diameter of the first O-ring.

24. The pressure regulator of claim 22, wherein the drain check shuttle includes a third O-ring disposed in the outer wall of the drain check shuttle to form a dynamic seal with the inner side wall of the housing.

* * * * *